US008638551B2

(12) United States Patent
Tsai et al.

(10) Patent No.: US 8,638,551 B2
(45) Date of Patent: Jan. 28, 2014

(54) CARD READER HAVING COMMUNICATING FUNCTION

(75) Inventors: Chia-Hsin Tsai, New Taipei (TW); Jen-Fu Chen, New Taipei (TW)

(73) Assignee: Power Quotient International Co., Ltd., New Taipei (TW)

( * ) Notice: Subject to any disclaimer, the term of this patent is extended or adjusted under 35 U.S.C. 154(b) by 216 days.

(21) Appl. No.: 13/330,382

(22) Filed: Dec. 19, 2011

(65) Prior Publication Data

US 2013/0077229 A1 Mar. 28, 2013

(30) Foreign Application Priority Data

Sep. 26, 2011 (TW) .............................. 100217968 U

(51) Int. Cl.
*G06F 1/16* (2006.01)
*H05K 5/00* (2006.01)
*H05K 7/00* (2006.01)
*G06K 7/08* (2006.01)

(52) U.S. Cl.
USPC ........................................ 361/679.4; 235/451

(58) Field of Classification Search
None
See application file for complete search history.

(56) References Cited

U.S. PATENT DOCUMENTS

| 6,648,224 | B2 * | 11/2003 | Lee .............................. 235/451 |
| 6,776,345 | B1 * | 8/2004 | Liang .............................. 235/486 |
| 7,017,809 | B2 * | 3/2006 | Korber et al. .................. 235/440 |
| 7,066,386 | B2 * | 6/2006 | Izumi ............................. 235/381 |
| 7,293,717 | B1 * | 11/2007 | Pathmasuntharan et al. . 235/492 |
| 7,597,250 | B2 * | 10/2009 | Finn .............................. 235/380 |
| 7,620,844 | B2 * | 11/2009 | Mambakkam et al. ....... 714/6.12 |
| 7,721,962 | B2 * | 5/2010 | Moon ............................ 235/441 |
| 2002/0061672 | A1 * | 5/2002 | Burkart ......................... 439/260 |
| 2002/0185533 | A1 * | 12/2002 | Shieh et al. ................... 235/441 |
| 2003/0094490 | A1 * | 5/2003 | Lee ............................... 235/441 |
| 2004/0000588 | A1 * | 1/2004 | Cheng .......................... 235/441 |
| 2004/0027879 | A1 * | 2/2004 | Chang .......................... 365/200 |
| 2004/0076048 | A1 * | 4/2004 | Kabenjian et al. ........... 365/200 |
| 2004/0247297 | A1 * | 12/2004 | Yang ............................. 386/124 |
| 2004/0257919 | A1 * | 12/2004 | Hsieh .............................. 369/1 |
| 2005/0051626 | A1 * | 3/2005 | Hsiao .......................... 235/441 |
| 2005/0120165 | A1 * | 6/2005 | Liang ........................... 711/103 |
| 2005/0252969 | A1 * | 11/2005 | Wu ............................... 235/441 |
| 2006/0011723 | A1 * | 1/2006 | Yeh .............................. 235/441 |
| 2006/0086792 | A1 * | 4/2006 | Chen et al. ................... 235/441 |
| 2007/0205281 | A1 * | 9/2007 | Tsuyuguchi et al. ......... 235/451 |
| 2008/0014867 | A1 * | 1/2008 | Finn ............................. 455/41.1 |
| 2008/0015715 | A1 * | 1/2008 | Shen .............................. 700/94 |
| 2008/0019086 | A1 * | 1/2008 | Kim ............................. 361/681 |
| 2008/0194121 | A1 * | 8/2008 | Chang et al. .................. 439/59 |
| 2008/0291713 | A1 * | 11/2008 | Tang et al. ..................... 365/52 |
| 2009/0321519 | A1 * | 12/2009 | Tran ............................. 235/439 |
| 2010/0078470 | A1 * | 4/2010 | DalPorto ...................... 235/375 |
| 2010/0085856 | A1 * | 4/2010 | Choi .............................. 369/85 |
| 2010/0227644 | A1 * | 9/2010 | Yu et al. ....................... 455/558 |

* cited by examiner

*Primary Examiner* — Jinhee Lee
*Assistant Examiner* — Xanthia C Cunningham
(74) *Attorney, Agent, or Firm* — Guice Patents PLLC

(57) ABSTRACT

The present invention relates to a card reader having communicating function which includes: a top cover; a bottom cover having a first open slot at one side; a printed circuit board; a first memory insertion slot allowing a first removable memory card to be inserted; a processor for controlling the access of first removable memory card; a wireless communication module; a card reader controller; a connector; a charging circuit; a rechargeable battery; and a voltage regulation circuit; such that a portable electronic device is able to access the data in the first removable memory card with a wireless means, or a mainframe is able to access the data in the first removable memory card through the connector.

12 Claims, 4 Drawing Sheets

CARD READER HAVING COMMUNICATING FUNCTION

BACKGROUND OF THE INVENTION

1. Field of the Invention

The present invention relates to a card reader, especially to a card reader having communicating function.

2. Description of Related Art

The Apple Inc. has launched a tablet PC, named in iPAD, and the product receives a warm welcome in the marketplace. However, the iPAD adopts a closed system and is not equipped with a connector or card reader insertion slot with USB interface. As such, when the built-in memory is full, the operation of data backup or expanding memory capacity cannot be performed unless deleting the existed files.

In the marketplace, many types of flash memories are available, wherein the SD memory card has the advantages of larger capacity and lower price. As a result, most of the portable electronic devices, e.g. a digital camera or digital recorder, are equipped with at least a SD memory card insertion slot for lowering the expenditure of buying memory cards.

What shall be addressed is that a conventional card reader for flash memory is provided with the function of accessing the data stored in the flash memory, but a wireless communication function is not equipped. So for a portable electronic device, e.g. iPAD, it cannot access the data of a flash memory received in the card reader with a wireless means for achieving the object of data backup and expanding memory capacity.

In view of the aforesaid disadvantages of conventional card reader, the present invention provides a card reader having communicating function.

SUMMARY OF THE INVENTION

One primary objective of the present invention is to provide a card reader having communicating function, wherein a wireless communication module is built-in for receiving the data transferred from a portable electronic device with a wireless means and storing the data is a memory card for achieving the object of data backup and expanding memory capacity.

For achieving the mentioned objective, the present invention provides a card reader having communicating function, which includes: a top cover; a bottom cover capable of being engaged with the top cover for forming an accommodation space, one side thereof is formed with a first open slot, and a second open slot is formed below the first open slot; a printed circuit board received in the accommodation space; a first memory insertion slot disposed on the printed circuit board and exposed outside the first open slot for allowing a first removable memory card to be inserted; a processer disposed on the printed circuit board and coupled to the first memory insertion slot for controlling the access of first removable memory card; a wireless communication module disposed on the printed circuit board and coupled to the processor for being controlled by the processor for the wireless communication; a card reader controller disposed on the printed circuit board and coupled to the processor; a connector disposed on the printed circuit board and exposed outside the second open slot, coupled to the card reader controller and capable of being connected to a mainframe via a cable for obtaining a DC power; a charging circuit disposed on the printed circuit board and coupled to the processor and the card reader controller for receiving the DC power and outputting a charging power; a rechargeable battery coupled to the charging circuit for receiving the charging power and outputting a battery power after being charged; and a voltage regulation circuit disposed on the printed circuit board and coupled to the processor, the first memory insertion slot and the wireless communication module for outputting the battery power having the voltage being regulated to the processor, the first memory insertion slot and the wireless communication module; such that a portable electronic device is able to access the data in the first removable memory card with a wireless means, or the mainframe is able to access the data in the first removable memory card via the cable.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
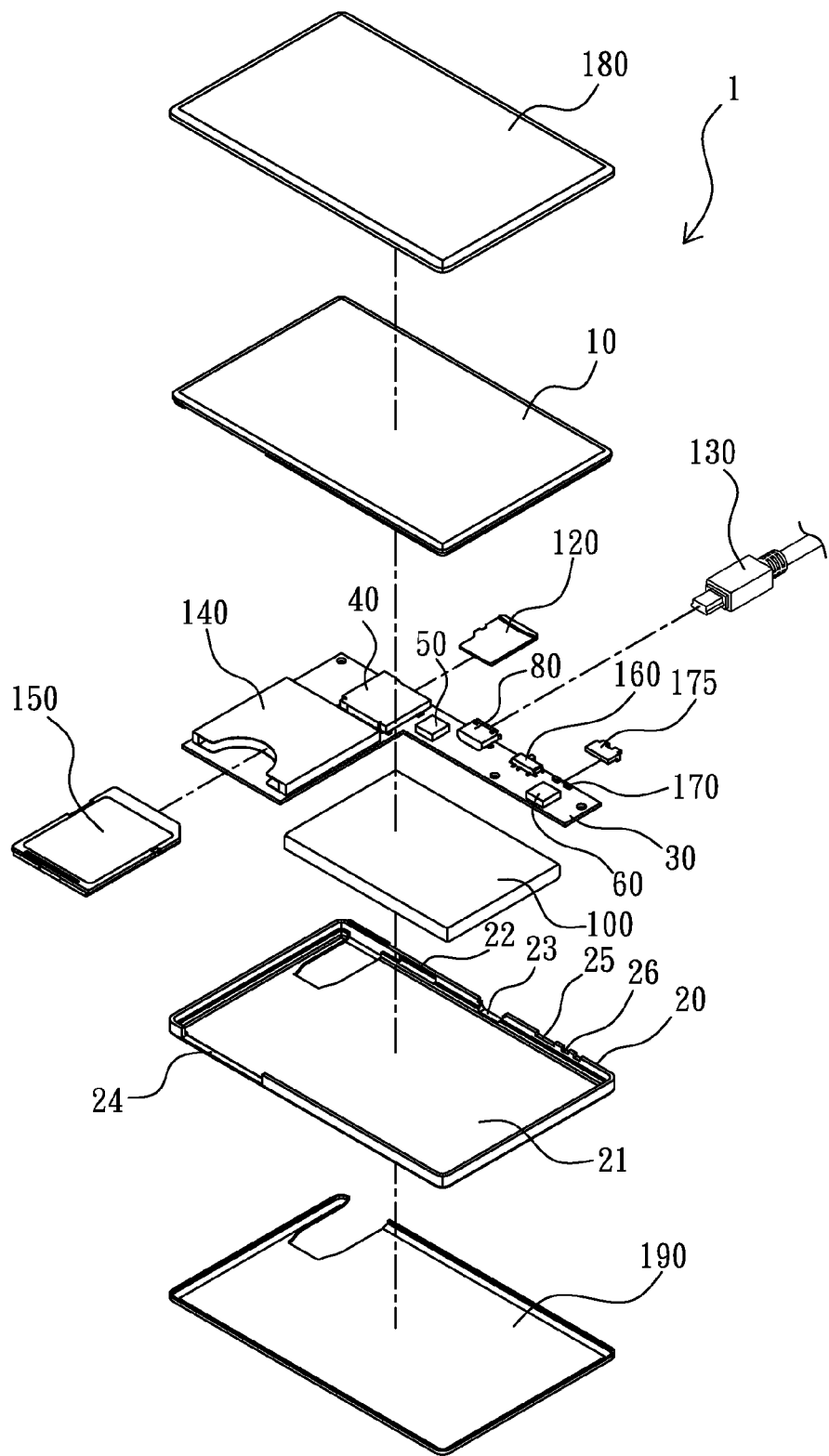
FIG. 1 is a schematic exploded view illustrating the card reader having communicating function, according to one preferred embodiment of the present invention.
Figure 2A:
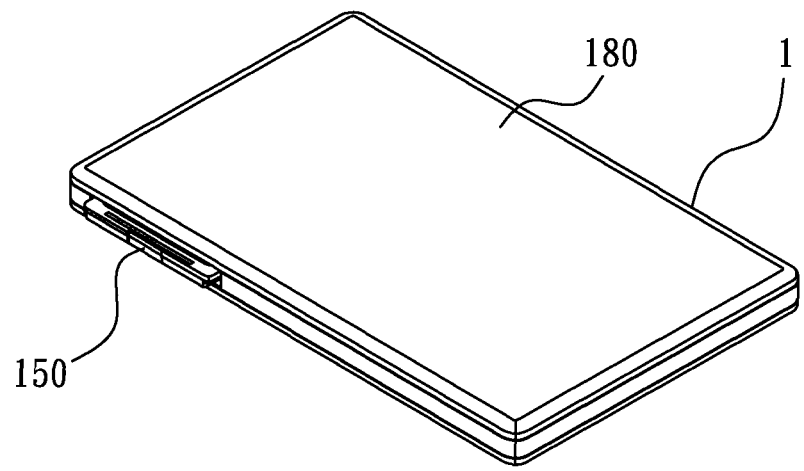
FIG. 2a is a schematic view illustrating the front assembly of the card reader having communicating function, according to one preferred embodiment of the present invention.
Figure 2B:
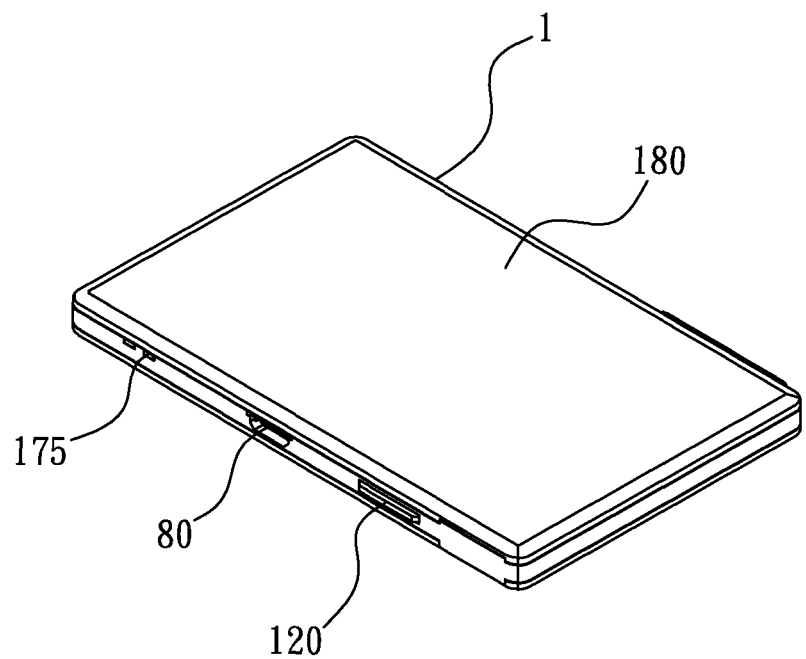
FIG. 2b is a schematic view illustrating the rear assembly of the card reader having communicating function, according to one preferred embodiment of the present invention.
Figure 3:
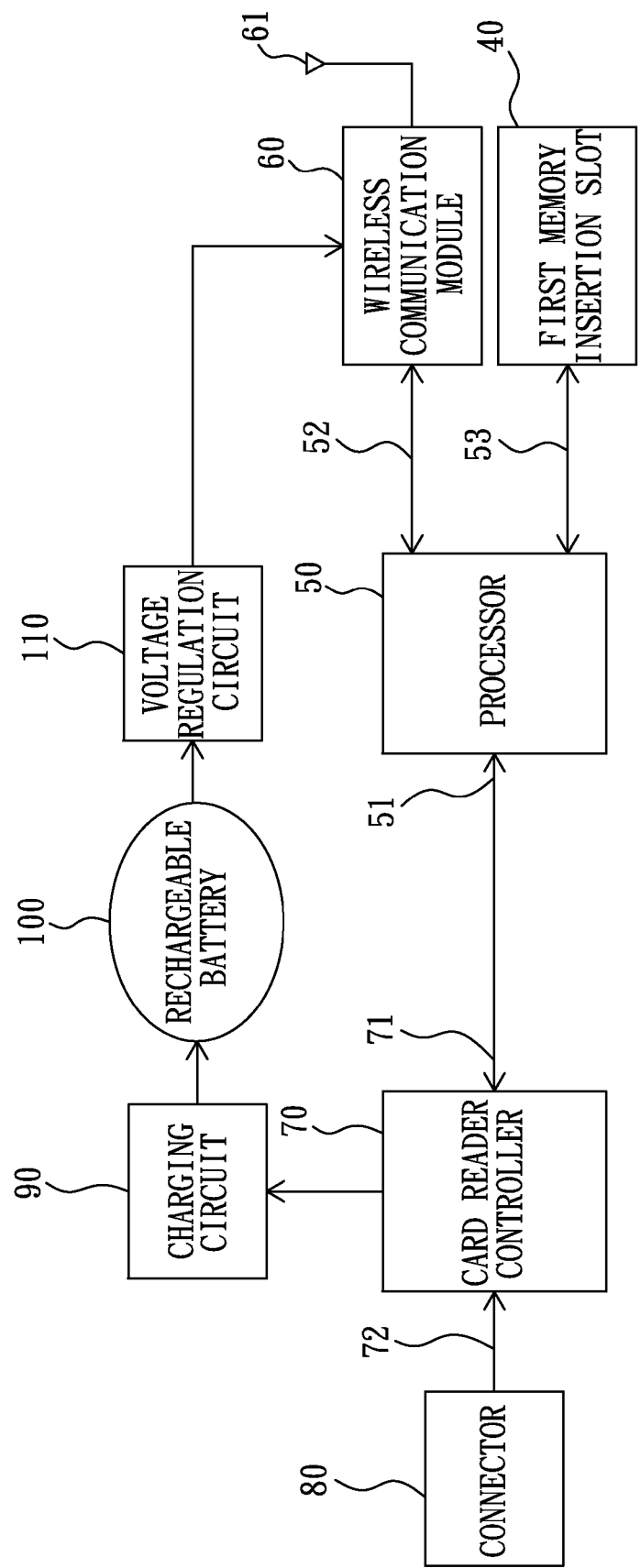
FIG. 3 is a block diagram illustrating the card reader having communicating function, according to one preferred embodiment of the present invention.
Figure 4:
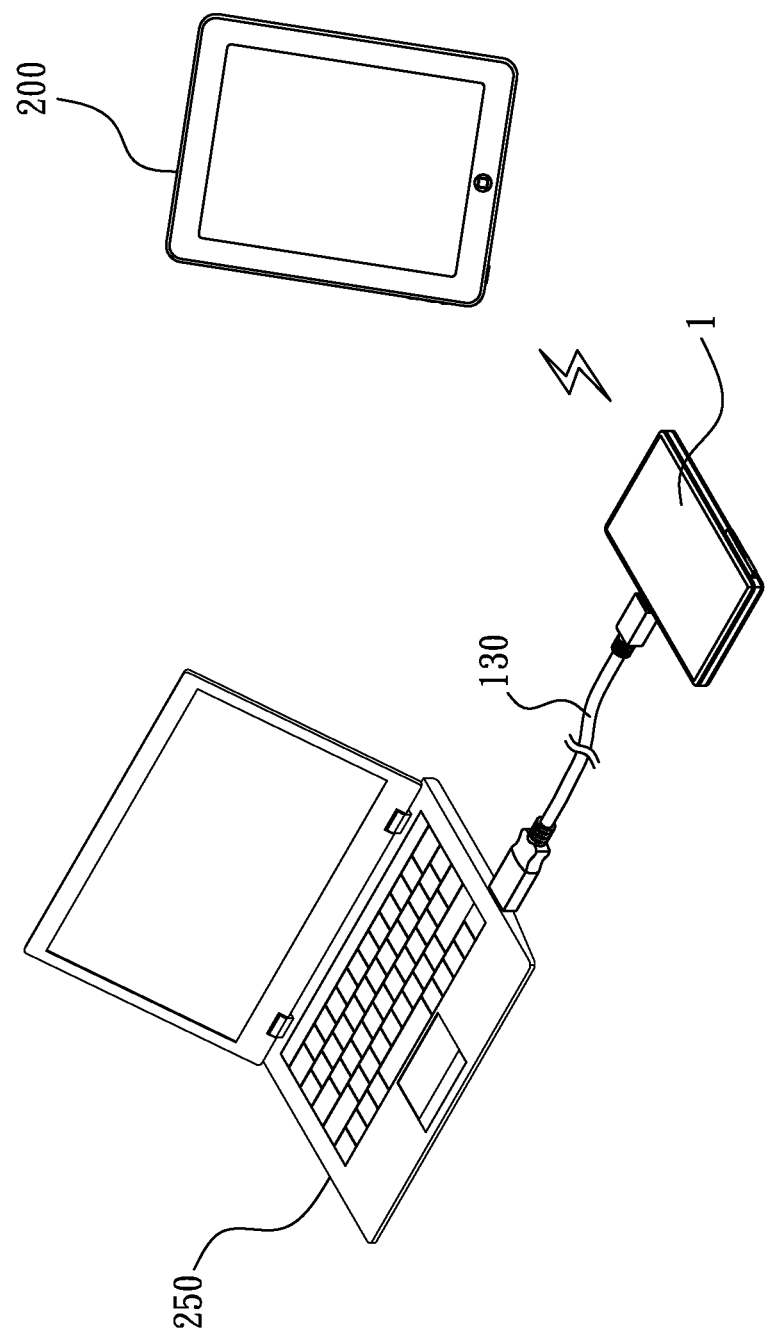
FIG. 4 is a schematic view illustrating the operation of the card reader having communicating function, according to one preferred embodiment of the present invention.

Referring from FIG. 1 to FIG. 4, wherein FIG. 1 is a schematic exploded view illustrating the card reader having communicating function, according to one preferred embodiment of the present invention; FIG. 2a is a schematic view illustrating the front assembly of the card reader having communicating function, according to one preferred embodiment of the present invention; FIG. 2b is a schematic view illustrating the rear assembly of the card reader having communicating function, according to one preferred embodiment of the present invention; FIG. 3 is a block diagram illustrating the card reader having communicating function, according to one preferred embodiment of the present invention; and FIG. 4 is a schematic view illustrating the operation of the card reader having communicating function, according to one preferred embodiment of the present invention.

As shown in figures, the card reader 1 having communicating function provided by the present invention includes: a top cover 10; a bottom cover 20; a printed circuit board 30; a first memory insertion slot 40; a processor 50; a wireless communication module 60; a card reader controller 70; a connector 80; a charging circuit 90; a rechargeable battery 100; and a voltage regulation circuit 110.

The top cover 10 is made of an insulation material, e.g. but not limited to plastic.

The bottom cover 20 is made of an insulation material, e.g. but not limited to plastic, and capable of being engaged with the top cover 10 thereby forming an accommodation space 21, one side thereof, e.g. but not limited to the right side, is formed with a first open slot 22, wherein a second open slot 23 is formed below the first open slot 22. In addition, another side of the bottom cover 20 is further formed with a third open slot 24, and a fourth open slot 25 and a fifth open slot 26 are further formed below the second open slot 24.

The printed circuit board 30 is disposed in the accommodation space 21 for receiving the first memory insertion slot 40, the processor 50, the wireless communication module 60, the card reader controller 70, the connector 80, the charging circuit 90 and the voltage regulation circuit 110.

The first memory insertion slot 40 is disposed on the printed circuit board 30 and exposed outside the first open slot 22 for allowing a first removable memory card 120 to be inserted, wherein the removable memory card 120 is e.g. but not limited to a micro SD memory card.

The processor 50 is disposed on the printed circuit board 30 and coupled to the first memory insertion slot 40 for controlling the access of first removable memory card 120. The processor 50 is, e.g. but not limited to, a micro controller respectively having a SD memory card interface 51, a SDIO interface 52 and a SDHC interface 53, wherein the SIDO interface is coupled to the wireless communication module 60, and the SDHC interface 53 is coupled to the first memory insertion slot 40.

The wireless communication module 60 is disposed on the printed circuit board 30 and coupled to the processor 50 for being controlled by the processor 50 to transfer the data in the first removable memory card 120 to a portable electronic device 200 with a wireless communication means. The wireless communication module 60 is, e.g. but not limited to, a WIFI wireless communication module or 3G wireless communication module, the portable electronic device 200 is, e.g. but not limited to, an iPAD tablet PC. Moreover, the wireless communication module 60 further has an antenna 61 for emitting or receiving wireless signals.

The card reader controller 70 is disposed on the printed circuit board 30 and coupled to the processor 50 for controlling the access of first removable memory card 120. In addition, the card reader controller 70 further has a SD memory card interface 71 and a USB interface 72, wherein the SD memory card interface 71 is coupled to the SD memory card interface 51 of the processor 50, and the USB interface 72 is coupled to the connector 80.

The connector 80 is disposed on the printed circuit board 30, exposed outside the second open slot 23, and coupled to the card reader controller and capable of being connected to a mainframe 250 via a cable 130 for obtaining a DC power. The connector 80 is, e.g. but not limited to, a USB2.0 or USB3.0 connector, the mainframe 250 is, e.g. but not limited to, a desktop computer or notebook computer, the cable 130 is, e.g. but not limited to, a USB2.0 or USB3.0 cable, and the DC power is, e.g. but not limited to, 3.3V.

The charging circuit 90 is disposed on the printed circuit board 30 and coupled to the processor 50 and the card reader controller 70 for receiving the DC power and outputting a charging power ($V_{out}$) to the rechargeable battery 100 thereby charging the rechargeable battery 100. Moreover, when the rechargeable battery 100 is fully charged, a signal is sent by the charging circuit 90 to inform the processor 50.

The rechargeable battery 100 is coupled to the charging circuit 90 for receiving the charging power ($V_{out}$) then outputting a battery power ($V_{bat}$), wherein the rechargeable battery 100 is, e.g. but not limited to, a lithium ion rechargeable battery, the battery power is, e.g. but not limited to, DC 3.3V.

The voltage regulation circuit 110 is disposed on the printed circuit board 30 and coupled to the first memory insertion slot 40, the processor 50 and the wireless communication module 60, such that the battery power having the voltage being regulated can be outputted to the first memory insertion slot 40, the processor 50 and the wireless communication module 60 for supplying the required electric power.

In addition, the card reader 1 of the present invention further has a second memory insertion slot 140, which is disposed on the printed circuit board 30 and exposed outside the third open slot 24 for allowing a second removable memory card 150 to be inserted. The second memory insertion slot 140 is, e.g. but not limited to, a SD memory card insertion slot, and the second removable memory card 150 is, e.g. but not limited to, a SD memory card.

Moreover, the card reader 1 of the present invention further has a power switch 160, which is disposed on the printed circuit board 30 and exposed outside the fourth open slot 25, and coupled to the output terminal of the voltage regulation circuit 110 for actuating or cutting off the supply of battery power ($V_{bat}$) to the first memory insertion slot 40, the processor 50 and the wireless communication module 60.

In addition, the card reader 1 of the present invention further has a light emitting diode 170 and a lens 175, wherein the light emitting diode 170 is disposed on the printed circuit board 30 and coupled to the card reader controller 70, the lens 175 is installed at the outer side of light emitting diode 170 and exposed outside the fifth open slot 26 thereby showing the working state of the card reader controller 70.

Moreover, the card reader 1 of the present invention has a decorative top cover 180 and a decorative bottom cover 190, wherein the decorative top cover 180 is engaged at the outer side of the top cover 10, and the decorative bottom cover 190 is engaged at the outer side of the bottom cover 20.

Referring to FIG. 3, the processor 50 has a SD memory card interface 51, a SDIO interface 52 and a SDHC interface 53, wherein the SDIO interface 51 is coupled to the wireless communication module 60, the SDHC interface 53 is coupled to the first memory insertion slot 40. The card reader controller 70 has a SD memory card interface 71 and a USB interface 72, wherein the SD memory card interface 71 is coupled to the SD memory card interface 51 of the processor 50, the USB interface 72 is coupled to the connector 80, the card reader controller 71 is enabled to switch the SD memory card interface 71 and the USB interface 72, so the processer 50 can access the USB interface of other device (not shown) through the card reader controller 70.

As shown in FIG. 4, when in use, the card reader 1 of the present invention is firstly connected to the mainframe 250 via the cable 130 for charging the rechargeable battery 100, at this moment, the mainframe 250 can also access the data in the first removable memory card 120 or the second removable memory card 150 via the cable 130; when the rechargeable battery 100 is fully charged, the charging circuit 90 informs the processor 50 to terminate the power supply to the charging circuit 90, at this moment, the processor 50 informs the card reader controller 70 to cut off the DC power.

When the portable electronic device 200 is connected to the wireless communication module 60 with a wireless means, the wireless communication module 60 informs the processor 50 such that the card reader controller 70 is disabled by the processor 50 from accessing the first removable memory card 120 or the second removable memory card 150, at this moment, the data in the portable electronic device 200 can be stored in the first removable memory card 120 or the second removable memory card 150 with a wireless means, thereby achieving the object of data backup and expanding memory capacity. As such, the card reader 1 provided by the present invention has an advantage of being equipped with wireless communication function compared to the conventional card reader.

Based on what is disclosed above, the card reader having communicating function provided by the present invention is built-in with a wireless communication module for receiving the data in a portable electronic device with a wireless means, and the received data is stored in a memory card for achieving the object of data backup and expanding memory capacity. As such, the card reader having communicating function provided by the present invention is novel and has technical advantage compared to the conventional card reader.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A card reader having communicating function, including:
   a top cover;
   a bottom cover capable of being engaged with said top cover for forming an accommodation space, one side thereof being formed with a first open slot, and a second open slot being formed below the first open slot;
   a printed circuit board received in said accommodation space;
   a first memory insertion slot disposed on said printed circuit board and exposed outside said first open slot for allowing a first removable memory card to be inserted;
   a processer disposed on said printed circuit board and coupled to said first memory insertion slot for controlling the access of first removable memory card;
   a wireless communication module disposed on said printed circuit board and coupled to said processor for being controlled by said processor for said wireless communication;
   a card reader controller disposed on said printed circuit board and coupled to said processor;
   a connector disposed on said printed circuit board and exposed outside said second open slot, coupled to said card reader controller and capable of being connected to a mainframe via a cable for obtaining a DC power;
   a charging circuit disposed on said printed circuit board and coupled to said processor and said card reader controller for receiving the DC power and outputting a charging power;
   a rechargeable battery coupled to said charging circuit for receiving said charging power and outputting a battery power after being charged; and
   a voltage regulation circuit disposed on said printed circuit board and coupled to said processor, said first memory insertion slot and said wireless communication module for outputting said battery power having the voltage being regulated to said processor, said first memory insertion slot and said wireless communication module;
   such that a portable electronic device being able to access the data in said first removable memory card with a wireless means, or said mainframe being able to access the data in said first removable memory card via said cable.

2. The card reader according to claim 1, wherein another side of said bottom cover is formed with a third open slot, and a fourth open slot and a fifth open slot are further formed below said second open slot.

3. The card reader according to claim 2, further including a second memory insertion slot, which is disposed on said printed circuit board and exposed outside said third open slot for allowing a second removable memory card to be inserted.

4. The card reader according to claim 3, wherein said first memory insertion slot is a micro SD memory card insertion slot, said second memory insertion slot is a SD memory card insertion slot, said first removable memory card is a micro SD memory card, said second removable memory card is a SD memory card.

5. The card reader according to claim 1, further including a power switch disposed on said printed circuit board and exposed outside said fourth open slot, coupled to the output terminal of said voltage regulation circuit for actuating or cutting off the supply of battery power to said processor, said first memory insertion slot and said wireless communication module.

6. The card reader according to claim 1, wherein further including a light emitting diode and a lens, wherein said light emitting diode is disposed on said printed circuit board and coupled to said card reader controller, said lens is installed at the outer side of light emitting diode and exposed outside said fifth open slot, thereby showing the working state of said card reader controller.

7. The card reader according to claim 1, wherein said mainframe is a computer, the connector is a USB2.0 or USB3.0 connector.

8. The card reader according to claim 3, wherein said processor is a micro controller respectively having a SD memory card interface, a SDIO interface and a SDHC interface, wherein said SDIO interface is coupled to said wireless communication module, said SDHC interface is coupled to said first removable memory card and said second removable memory card; said card reader controller has a SD memory card interface and a USB interface, wherein said SD memory card interface is coupled to said SD memory card interface of said processor, said USB interface is coupled to said connector.

9. The card reader according to claim 1, wherein said wireless communication module is a WIFI wireless communication module or 3G wireless communication module, and said wireless communication module further has an antenna.

10. The card reader according to claim 1, wherein said DC power and said battery power are both DC 3.3V.

11. The card reader according to claim 1, wherein said rechargeable battery is a lithium ion rechargeable battery.

12. The card reader according to claim 1, further including a decorative top cover and a decorative bottom cover, wherein said decorative top cover is engaged at the outer side of said top cover, said decorative bottom cover is engaged at the outer side of said bottom cover.

* * * * *